United States Patent [19]
Kline

[11] 4,222,003
[45] Sep. 9, 1980

[54] POWER SUPPLY WITH CURRENT LIMITING

[75] Inventor: Christopher Kline, Grand Prairie, Tex.

[73] Assignee: Tandy Corporation, Fort Worth, Tex.

[21] Appl. No.: 926,956

[22] Filed: Jul. 21, 1978

[51] Int. Cl.² .............................................. G05F 1/58
[52] U.S. Cl. ........................................ 323/9; 323/25
[58] Field of Search ................ 323/9, 25, 20, 22 T, 323/23

[56] References Cited

U.S. PATENT DOCUMENTS

| | | | |
|---|---|---|---|
| 3,304,490 | 2/1967 | Dubin et al. ............................ | 323/9 |
| 3,504,272 | 3/1970 | Kenney ............................. | 323/25 X |
| 3,702,434 | 11/1972 | Ryan .................................... | 323/9 X |
| 3,801,894 | 4/1974 | Spiegel ................................... | 323/9 |
| 3,818,366 | 6/1974 | Arimura et al. .................... | 323/25 X |
| 4,025,841 | 5/1977 | Chambers et al. ....................... | 323/9 |
| 4,074,182 | 2/1978 | Weischedel ........................... | 323/25 |

Primary Examiner—A. D. Pellinen
Attorney, Agent, or Firm—Wolf, Greenfield & Sacks

[57] ABSTRACT

The power supply is powered preferably from a conventional AC input line by way of an AC adapter and preferably provides DC voltage levels of −5 volts and +5 and +12 volts. The −5 volt level uses a single zener diode for regulation while the other two logic levels use voltage regulators each having pass transistor means associated therewith. The circuitry also includes current limiting circuitry and filter means.

15 Claims, 2 Drawing Figures

POWER SUPPLY WITH CURRENT LIMITING

BACKGROUND AND SUMMARY OF THE INVENTION

The present invention relates to a power supply circuit and preferably one for providing both positive and negative DC voltage levels. The power supply of this invention may be used for many different applications but is primarily adapted for use with a microcomputer system.

One object of the present invention is to provide an improved power supply circuit having voltage regulation. In the preferred embodiment of the invention, at least one voltage regulator circuit is used having associated therewith pass transistor means, either in the form of a single transistor or a transistor pair.

Another object of the present invention is to provide an improved power supply circuit having current limiting means.

Still another object of the present invention is to provide an improved power supply circuit that is relatively simple in construction, that uses relatively few circuit components, and that yet provides a plurality of DC voltage levels in the usual logic level range.

To accomplish the foregoing and other objects of this invention, there is provided a power supply circuit that comprises means for receiving an unregulated input voltage, which voltage is typically at least on the order of 5 volts DC. Preferably, there is provided an on-off switch, which in the disclosed embodiment, has contacts for individually interrupting separate voltage lines coupling to each individual voltage circuit. Also, in the disclosed embodiment at the input there is provided a bridge circuit for providing full wave rectification. Furthermore, the power supply circuit of this invention may be operated from an AC adapter which can provide an unregulated DC voltage of, for example, 18 or 19 volts and an AC voltage which couples to the bridge circuit. The output of the bridge circuit preferably provides both positive and negative voltages for generating the voltage levels on the +5 volt bus and −5 volt bus. Of course, in accordance with the invention, many different voltage levels can be employed, including even a power supply for providing only a single voltage level. The circuit of the present invention has at least one voltage bus and a pass transistor means which may comprise either a single transistor or a pair of transistors. This pass transistor means has main electrodes intercoupling between the input to the circuit and the voltage bus. Furthermore, the pass transistor means has a control electrode which is controlled from the voltage regulator. In the disclosed embodiment, there is a regulator associated with two of the voltage busses. This voltage regulator comprises means for establishing a voltage reference, means for monitoring the voltage bus and the voltage reference, which is preferably an operational amplifier, and output control transistor means, having an output coupling to the control electrode of the pass transistor means. This regulator means may comprise a current source in series with a zener diode for providing the reference voltage while the output control transistor means may comprise a pair of transistors one of which is controlled externally of the voltage regulator. In this regard the power supply circuit of this invention also includes a current limiting transistor means having electrodes coupled to the reference voltage and the voltage bus and also having an output electrode for operating the control transistor means of the regulator to decrease current flow through the pass transistor means when the current limiting transistor means detects an increased current flow in the voltage bus. Preferably, there is provided in series with the pass transistor, a sensing resistor essentially connected in parallel with one main electrode of the pass transistor and the voltage bus. It is the voltage developed across this resistor that is sensed by the voltage regulator for maintaining a proper voltage level on the output bus.

DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
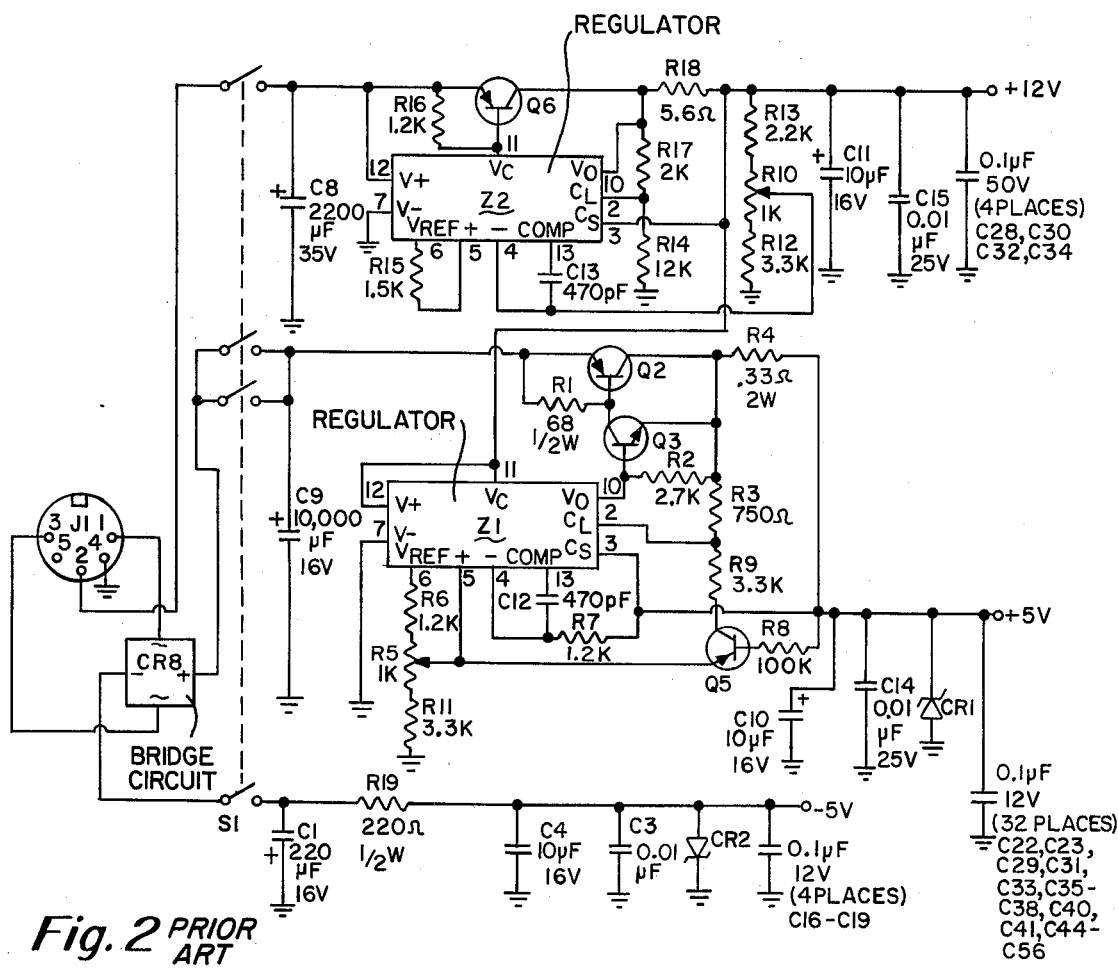
FIG. 1 is a circuit schematic diagram of a preferred embodiment of the power supply circuit of this invention.

As disclosed in FIG. 1, the power supply of this invention develops three different voltage levels of +12 volts at about 350 milliamps; +5 volts at about 1.2 amps; and −5 volts at 1 milliamp. This supply, although designed for use with a microcomputer, may also find other uses in supplying voltage levels in particular for logic circuits or other applications requiring relatively low DC voltages. The individual +12 volt and +5 volt supplies are regulated and also current protected, especially against shorts. The −5 volt supply does not use the same type of voltage regulation and relies upon only a single zener diode for regulation. Unregulated power is supplied to each of the separate circuits preferably from an AC adapter which provides certain voltage levels at jack J1, pins 1–5 shown in FIG. 1.

The AC adapter or converter, as it is sometimes referred to, power pack, may be of the type used with calculators or TV game products. This adapter or power pack is not depicted in the drawings. This adapter typically comprises a single transformer with one primary winding and two secondary windings. The primary circuit is usually designed for 115 VAC and typically has an operating range of 105 to 135 VAC. There is usually a fuse on the primary side of the transformer.

In the adapter, the two secondary circuits are both center-tapped. One secondary is typically rated at 14 volts AC at 1 amp. This output is coupled to the bridge circuit CR8 of FIG. 1 and is used in association with the +5 and −5 volt supplies. The other secondary winding, not disclosed in the drawings, but a part of the adapter uses internal diodes and it outputs about 19.8 VDC at about 350 milliamps. This DC level is coupled by way of the jack J1 shown in FIG. 1 to the +12 volt supply.

Figure 2:
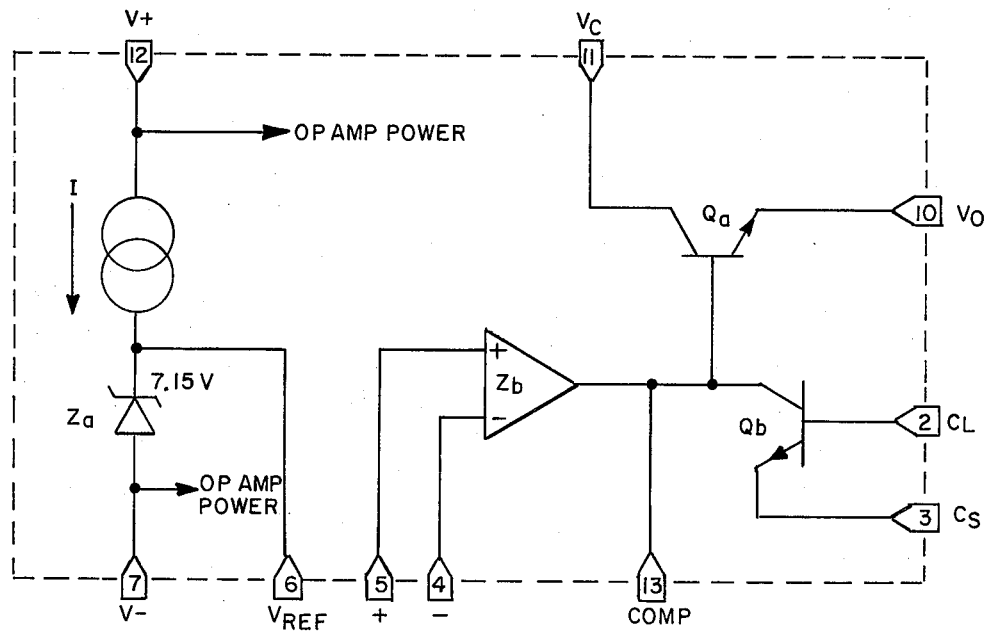
FIG. 2 is a prior art schematic circuit detail for a preferred embodiment of the voltage regulator shown in FIG. 1.

An unregulated voltage of about 19.8 VDC is coupled by way of jack J1, pin 2 to the +12 volt circuit by way of one of the contacts of switch S1. This voltage is supplied to filter capacitor C8 when the switch S1 is closed and the voltage is supplied to pin 12 of the regulator Z2 and also to the emitter of transistor Q6 which is the pass transistor. With regard to the regulator Z2 and the other regulator Z1 discussed hereinafter, reference is made to the circuit diagram of FIG. 2 showing the internal circuitry of these regulators. Both of these regulators are preferably 723 regulators made by companies such as Motorola, Fairchild, or Texas Instruments. The pin designations in FIG. 2 correspond with like pin designations used in FIG. 1 for both regulator circuits.

The filtered DC voltage at capacitor C8 couples to pin 12 of regulator Z2 and also to one side of resistor R16 which couples to the emitter of transistor Q6. As noted in FIG. 2, the voltage applied to pin 12 couples to circuitry within the regulator illustrated by a current source for supplying current to the zener diode Za. The other side of this zener diode is tied to ground as indicated in FIG. 1. The reference output from the regulator at pin 6 couples by way of resistor R15 to the positive input pin 5 of the regulator which couples to the positive input of the operational amplifier Zb shown in FIG. 2. On the other hand, the negative input to the operational amplifier Zb is taken from the wiper of potentiometer R10 which is in turn in series with resistors R12 and R13. Resistor R13 ties to the +12 volt bus. At initial power up the input pin 4 of the regulator Z2 is essentially at ground, forcing the output of the operational amplifier Zb to be at about 7.15 volts. Under this condition, transistor Qa turns on which in turn causes the pass transistor Q6 to turn on. The pass transistor Q6 of FIG. 1 controls the current flow by way of resistor R18 which is a sensing resistor to the +12 volt bus. The pass transistor, in addition to supplying current to the resistor R18 also connects to the voltage divider network comprised of resistors R12 and R13 and variable resistor R10. Resistor R10 is preferably adjusted to have an output voltage on its wiper of about 7.15 volts. This signal is couples to the input terminal 4 of the device Z2 which in turn couples to the negative input of the operational amplifier Zb. This reference voltage from the adjustable resistor R10 balances the operational amplifier and the external transistor Q6 is only sufficiently conductive to maintain the loop stable; the loop including the pass transistor, the adjustable resistor R10 and the internal circuitry shown in FIG. 2 coupling between the pins 4 and 11. If the bus voltage decreases due to a load change, this condition is sensed by the operational amplifier Zb and its output increases which in turn forces the current passed by transistor Qa to increase. This action in turn causes the pass transistor Q6 to increase in conduction, thus causing the output voltage on the +12 volt bus to rise to the proper 12 volts level to maintain the loop stabilized. On the other hand, if the bus voltage increases, the operational amplifier Zb shown in FIG. 2 causes the conduction of transistor Qa to decrease thereby decreasing the conduction of the transistor Q6. This action then tends to decrease the voltage on the bus thus stabilizing the circuit.

With regard to the +12 volt bus circuit and the regulator shown in FIG. 2, the transistor Qb is used to protect the power transistor Q6 against any excess current damage. Thus, if the voltage sensed across resistor R18 increases due to an increase in current through resistor R18 then there will also be a corresponding increase in voltage at the input pin 2 to the regulator Z2. When this voltage at pin 2 reaches approximately 12.6 volts, transistor Qb takes command of the operation of transistor Qa. As transistor Qb is turned on, transistor Qa tends to turn off thus also causing transistor Q6 to turn off. The voltage at the input pin 10 of the device Z2 has to approach approximately 14.7 volts before the transistor Qb takes charge of the operation of transistor Qa. With this voltage of 14.7 volts at pin 10, the 12 volt supply is approaching its maximum design current of 480 milliamps. If a short develops across the +12 volt bus, the transistor Qb is activated, forcing transistor Qa to cease conduction. When this occurs, the base of transistor Q6 rises to the input voltage level because of the coupling of resistor R16 between the emitter and base of power transistor Q6. Transistor Q6 thus interrupts the voltage to the output bus preventing any thermal damage to the circuitry including the resistor R18. Once any short circuit is removed, transistor Qb turns off and the system again is operational.

The circuitry including the regulator Z2 for supplying the +12 volt bus also includes a capacitor C13 connected between pins 13 and 4. This capacitor connects between the output of the operational amplifier and its negative input. This capacitor is for frequency compensation. It prevents the operational amplifier loop from going into oscillation. Capacitors C11 and C15 provide output filtering and noise suppression. In the diagram there is one other capacitor shown adjacent to capacitor C15. In actuality this is a series of 4 capacitors identified as capacitors C28, C30, C32 and C34. These capacitors are distributed along the 12 volt supply bus for transistor suppression.

FIG. 1 also shows the +5 volt supply which couples to the +5 volt bus from contacts of the switch S1. The +5 volt supply also uses a 723 regulator identified as device Z1. This device may be of the type shown in FIG. 2.

For the +5 volt supply, the AC adapter supplies about 15 volts AC at jack J1, pins 1 and 3. A full-wave rectifier CR8 rectifies this AC signal. When switch S1 is closed, the output from the rectifier bridge CR8 couples about 7 VDC through the switch contacts to the filter capacitor C9.

The basic input voltages for the devices Z1 and Z2 are essentially taken from the +12 volt bus at the output side of resistor R18. The pin 7 of the device Z1 is grounded as with the device Z2. Thus, the regulator current source depicted in FIG. 2 provides the standard voltage of about 7.15 volts at the cathode of zener diode Za. This reference voltage at pin 6 of the device Z1 is not applied through a single resistor like R15 but is instead applied to a resistor network comprised of resistors R6 and R11 along with variable resistor R5. The wiper arm of resistor R5 couples both to the emitter of transistor Q5 discussed hereinafter, and to the positive input of device Z1 at pin 5. This input couples to the positive input of the operational amplifier Zb shown in FIG. 2. The variable resistor R5 is adjusted to provide a 5 volt output on the pin 5 of device Z1. The negative input to the operational amplifier Zb is sourced through a resistor R7 which has its other side tied to the 5 volt bus. This line also connects to pin 3 of the regulator which couples to the emitter of transistor Qb. As with the +12 volt bus, with regard to the +5 volt bus, the operational amplifier Zb controls transistor Qa which in turn controls the bias drive for the transistor pair of transistors Q3 and Q2. Transistor Q3 is used to handle the greater base drive necessary for pass transistor Q2. The collector of transistor Q2 is tied to the current sensing resistor R4. Resistor R4 monitors the current that the +5 volt bus is producing in a similar manner to the monitoring provided by resistor R18 for the +12 volt bus. A current limiting circuit is also provided in association with device Z1 and comprising at least transistor Q5 and associated resistors.

In the operation of the +5 volt supply, if the operational amplifier Zb detects a rising or falling voltage condition at the output bus, there will be an adjustment of the base current to transistor Qa. The output of this transistor at pin 10 couples to the base of transistor Q3. Transistor Q3 is provided primarily for desired current gain.

The transistors Q3 and Q2 work similarly to the transistor Q6 so that when there is a decrease in voltage at the bus, the regulator Z1 causes these transistors to increase in conduction to stabilize the loop. In this case there is an increase in the output from amplifier $Z_b$ causing transistor $Q_a$ to increase in conduction which in turn causes transistors Q2 and Q3 to increase in conduction to maintain a constant bus voltage. Similarly, if there is an increase in voltage at the bus, the condution of these transistors decreases to stabilize the loop. In this case there is a decrease in the output from amplifier $Z_b$ causing transistor $Q_a$ to decrease in conduction which in turn causes transistors Q2 and Q3 to also decrease in conduction to maintain a constant bus voltage.

The transistor Q5 forms a part of a modified, foldback, current-limiting circuit. Transistor Q5 monitors the voltage developed across the sensing resistor R4 which is of course a function of the current in the +5 volt bus. As the transistor Q5 begins to turn on because of an increased current drive to the bus, the node between the resistors R3 and R9 provides an increasing voltage for the base drive of the transistor Qb within the regulator device. Thus, transistor Qb commences to take charge of the regulator loop with transistor Qb increasing in conduction. Transistor Qa is operated to decrease the conduction of transistors Q3 and Q2 and the entire supply circuit assumes a current limiting state. The current limiting action of transistor Q5 comes into play when the voltage across resistor R4 approaches approximately 0.6 volts. At that voltage the bus current is approximately 1.82 amps.

In FIG. 1 the capacitor C12 interconnects between pins 4 and 13 of regulator Z1. This capacitor forms the same frequency compensation function as capacitor C13 associated with device Z1. Capacitor C10 and C14 are output filter capacitors also used for noise suppression. In addition to these capacitors, there is one additional capacitor in parallel with C10 and C14 which is actually representative of 32 different 0.01 microfarad capacitors distributed throughout other devices not shown in the drawing that use the power supply voltages to suppress transit spikes that may occur in the voltage distribution system. There is also provided in parallel with these capacitors, a zener diode CR1 directly connected to the +5 volt bus. This diode is used as a crowbar circuit protection in case of any catastrophic failure in the utilization circuitry. For example, if there is a short that occurs between the +5 volt and +12 volt busses, the diode CR1 turns on, causing the +5 volt bus to go into its current limiting state. But since the diode CR1 is a 6.2 volt zener, it protects standard TTL logic devices connected to the +5 volt bus from any damage by a sudden application of the +12 volt level. Under normal operation, the diode CR1 is off with no current flowing through it.

In adjusting the circuit of FIG. 1, the +12 volt section is adjusted before the +5 volt section.

FIG. 1 also shows a −5 volt supply coupling to a −5 volt bus. The voltage for this supply is coupled from the rectifier CR8 at its output negative terminal which is at approximately −10 volts. This −10 VDC signal is coupled by way of one of the contacts switch S1. This voltage is filtered by capacitor C1 and applied to one side of resistor R19. Resistor R19 is used to limit the current for the zener diode CR2. The zener diode CR2 has a voltage of 5.1 volts. The capacitors C3 and C4 supply filtering and noise suppression while capacitors C16-C19 perform the transit suppression function. Again, these four capacitors are shown as a single capacitor.

What is claimed is:

1. A power supply circuit comprising;
   means for receiving an input voltage,
   means defining at least one voltage bus to which at least one load is connected,
   pass transistor means having main electrodes intercoupling between the input receiving means and the voltage bus and having a control electrode,
   regulator means comprising load current control means monitoring the voltage bus during a first load range, first control transistor means having an output coupling to the control electrode of the pass transistor means and responsive to a feedback signal from the load current during said first load range by controlling conduction of the pass transistor means, and second control transistor means for controlling the first control transistor means commencing at the attainment of a predetermined maximum load current,
   first current limiting means responsive to load current in the bus during a second load range greater than the first load range for controlling the second control transistor means which in turn controls the first control transistor means to limit the load current to said predetermined maximum load current,
   and second current limiting means including current limiting transistor means having an output electrode for operating the second control transistor means of the regulator means to decrease load current flow during a third overload range greater than the first and second load ranges.

2. A power supply circuit as set forth in claim 1 wherein said pass transistor means includes at least one transistor having the base electrode coupled to the regulator means, and a current sensing resistor coupled between one main electrode of the pass transistor and the voltage bus.

3. A power supply circuit as set forth in claim 2, wherein said load current control means of the regulator means includes amplifier means for monitoring the voltage bus and having its output coupled to both said first and second control transistor means.

4. A power supply circuit as set forth in claim 3 wherein said first control transistor means has its base driven from the output of the amplifier means, said amplifier means being an operational amplifier.

5. A power supply circuit as set forth in claim 1 including means for establishing a reference voltage and wherein said load current control means includes means receiving the signal from the voltage bus and means receiving the reference voltage to provide an error signal determined by a difference in the bus signal from the reference signal.

6. A power supply circuit as set forth in claim 5 wherein the load current control means includes amplifier means having its output coupling to the base electrode of the first control transistor means.

7. A power supply circuit as set forth in claim 6 wherein the emitter of the first control transistor means couples to the base of the pass transistor means and the base of the first control transistor means couples to the collector of the second control transistor means.

8. A power supply circuit as set forth in claim 1 wherein said first current limiting means includes a resistive network responsive to load current for feeding back a control voltage signal under loop control to the first control transistor means to hold the load current at a constant value over the second load range.

9. A power supply circuit as set forth in claim 1 including a load sensing resistance means coupled intermediate the pass transistor means and voltage bus, wherein said first current limiting means includes a resistive network forming part of a current stabilizing feedback loop coupled from the resistance means to the first control transistor means for maintaining constant current flow in the load over said second load range.

10. A power supply circuit comprising;
means for receiving an input DC voltage,
a voltage bus coupling to a load that may vary,
a regulator means including load current control means, and current limiting means,
said load current control means including pass transistor means having main electrodes intercoupling between the input receiving means and the voltage bus and having a control electrode, means operable during a first load range including feedback means coupled from the voltage bus to adjust load current by controlling conduction of said pass transistor means,
means operable during a second load range greater than said first load range commencing at the attainment of a predetermined maximum load current including said current limiting means for maintaining the load current at a value during the second load range no greater than said predetermined maximum load current, and
means operable during a third load range greater than the second load range for reducing load current to a predetermined minimum current at a short circuit load condition.

11. A power supply circuit as set forth in claim 10 wherein said means operable during a first load range includes voltage controllable means and said feedback means includes a line coupling from the voltage bus to the voltage controllable means having its output for control of the current passed via the pass transistor means.

12. A power supply circuit as set forth in claim 11 wherein said means operable during a second load range includes a current limiting feedback loop responsive to the current to the load reaching said maximum value for limiting conduction of said pass transistor means.

13. A power supply circuit as set forth in claim 12 wherein said voltage controllable means includes amplifier means and said current limiting feedback loop includes a current limiting transistor coupled to the pass transistor means.

14. A power supply circuit as set forth in claim 13 wherein said means operable during a third load range includes a second current limiting transistor operated to switch at a predetermined bus voltage to control the pass transistor means to have load current and load voltage decrease as a function of increased load.

15. A power supply circuit as set forth in claim 10 wherein said means operable during a third load range includes a current limiting transistor operated to switch at a predetermined bus voltage to control the pass transistor means to have load current and load voltage decrease as a function of increased load.

* * * * *